United States Patent
Hatano et al.

(10) Patent No.: US 7,656,434 B2
(45) Date of Patent: Feb. 2, 2010

(54) ANALOG FRONT-END DEVICE AND IMAGE PICKUP DEVICE

(75) Inventors: Toshinobu Hatano, Kyoto (JP); Keiichi Tsumura, Osaka (JP); Masakatsu Furuichi, Osaka (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 11/826,562

(22) Filed: Jul. 17, 2007

(65) Prior Publication Data
US 2008/0018769 A1    Jan. 24, 2008

(30) Foreign Application Priority Data
Jul. 24, 2006    (JP)    ............... 2006-200509

(51) Int. Cl.
*H04N 5/235* (2006.01)
*H04N 5/217* (2006.01)

(52) U.S. Cl. .................. 348/222.1; 348/241

(58) Field of Classification Search .............. 348/222.1, 348/241–251
See application file for complete search history.

(56) References Cited

U.S. PATENT DOCUMENTS

| | | | |
|---|---|---|---|
| 6,288,744 B1 * | 9/2001 | Takahashi et al. | 348/311 |
| 6,593,966 B1 * | 7/2003 | Watanabe | 348/312 |
| 7,385,634 B2 * | 6/2008 | Nakashita | 348/231.6 |
| 2002/0085112 A1 | 7/2002 | Hiramatsu et al. | |
| 2003/0169356 A1 * | 9/2003 | Suemoto | 348/294 |
| 2005/0140795 A1 * | 6/2005 | Hisamatsu et al. | 348/222.1 |
| 2005/0200744 A1 | 9/2005 | Kobayashi | |
| 2006/0022862 A1 * | 2/2006 | Egawa et al. | 341/155 |
| 2006/0214087 A1 * | 9/2006 | Komori et al. | 250/208.1 |

FOREIGN PATENT DOCUMENTS

JP    2005-244709    9/2005

* cited by examiner

*Primary Examiner*—Tuan Ho
*Assistant Examiner*—Trung Diep
(74) *Attorney, Agent, or Firm*—McDermott Will & Emery LLP

(57) ABSTRACT

A preprocessor converts an analog image signal, which is outputted from a solid-state image pickup sensor that photoelectric-converts an optical image of a subject, into digital image data. A timing generator periodically generates a drive pulse for driving the solid-state image pickup sensor continuously/discontinuously, and generates an output stop position signal that indicates an output stop position of the solid-state image pickup sensor when the solid-state image pickup sensor is driven discontinuously in sync with the drive pulse. A continuous data generator lets through the image data when the output stop position signal is invalid, and converts the image data inputted in a discontinuous state into continuous image data when the output stop position signal is valid.

11 Claims, 6 Drawing Sheets

ANALOG FRONT-END DEVICE AND IMAGE PICKUP DEVICE

BACKGROUND OF THE INVENTION

1. Field of the Invention

The present invention relates to an analog front-end device that is provided between a solid-state image pickup sensor and a digital signal processor in a digital camera. More specifically, the present invention relates to a technique for suppressing influences of digital noise when transferring image data.

2. Description of the Related Art

Recently, there has been a conspicuous shift from the analog technology to the digital technology in the camera industry. In particular, digital still cameras that require no film or development thereof have grown into a brisk business. Portable telephones with built-in cameras have become the main stream. The number of pixels has grown more and more and there has been a remarkable improvement in the picture quality obtained through image processing.

Figure 5:
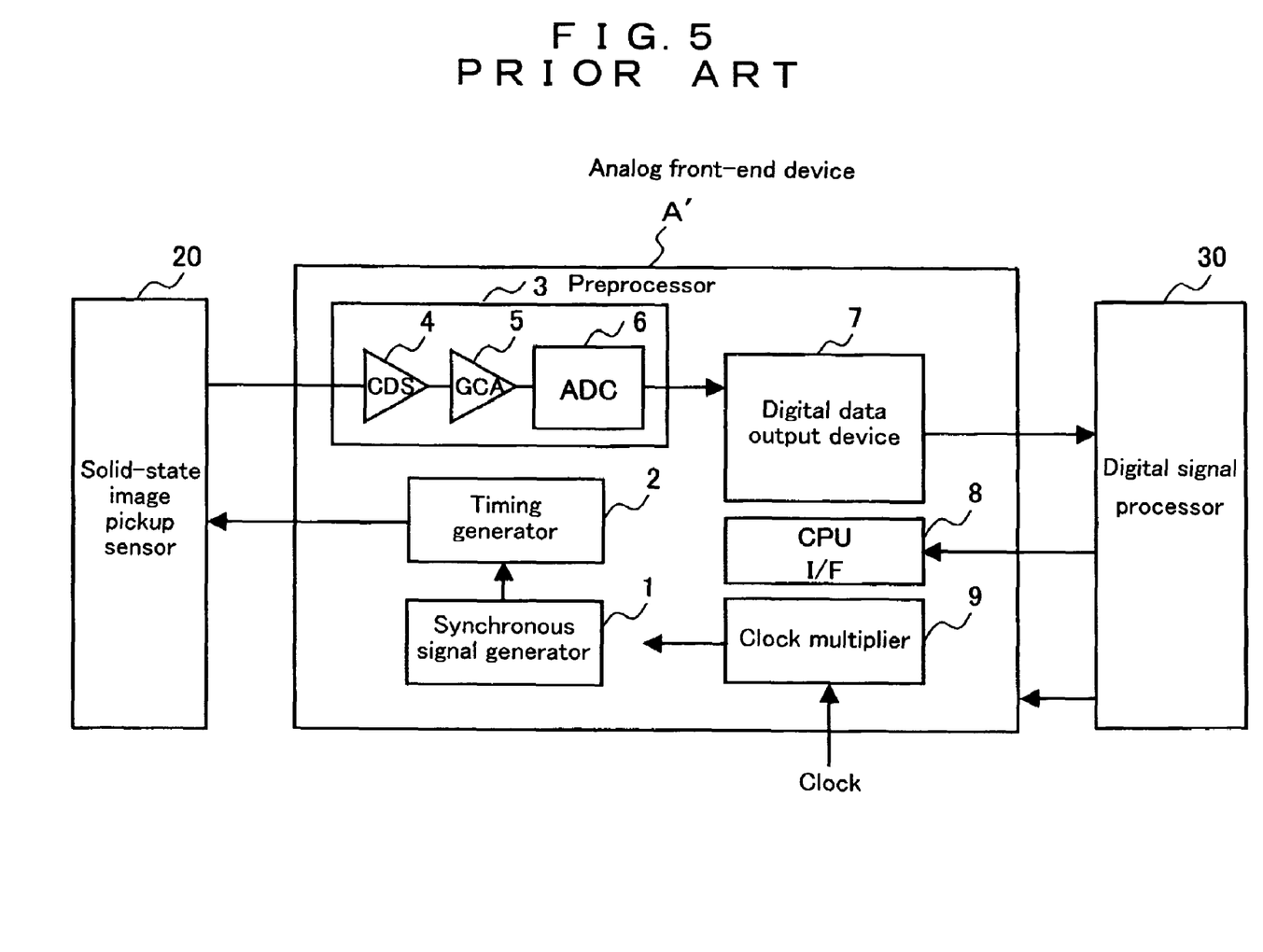
FIG. 5 is a block diagram for showing the structure of a conventional analog front-end device.

FIG. 5 is a block diagram for showing the structure of a conventional analog front-end device. Reference numeral 20 is a solid-state image pickup sensor that is a MOS-type image sensor, 30 is a digital signal processor (DSP) for performing image processing, A' is an analog front-end device, 1 is a synchronous signal generator for generating periodic synchronous signals, 2 is a timing generator for generating a drive pulse for the solid-state image pickup sensor 20, 3 is a preprocessor, 4 is a CDS (correlated double sampling) circuit, 5 is a GCA (gain control amplifier), 6 is an A/D converter, 7 is a digital data output device, 8 is a CPU interface, and 9 is a clock multiplier which multiplies and outputs clocks inputted from the outside.

In the conventional analog front-end device A', when imaging light enters the solid-state image pickup sensor 20 through a lens (not shown), it is converted into electric signals by a photodiode or the like, and image signals that are analog continuous signals are generated by vertical and horizontal drive pulses from the timing generator 2. The generated image signals have the 1/f reduced properly are processed in a sample hold circuit of the CDS circuit 4. Then, the image signals have the gain controlled in the GCA 5, and are converted into digital image signal data (RGB data) by the A/D converter 6. The converted image signal data is outputted in the parallel data form or outputted after being converted from the parallel form into the serial form, from the digital data output device 7 to the external digital signal processor 30, where various kinds of processing such as luminance signal processing, color separation, color matrix processing is executed.

When an electronic shutter mechanism of the solid-state image pickup sensor 20 does not employ a whole-pixel simultaneous readout system but employs a rolling shutter system of a successive readout type, an electronic shutter drive control pulse is outputted for each line.

Figure 6:
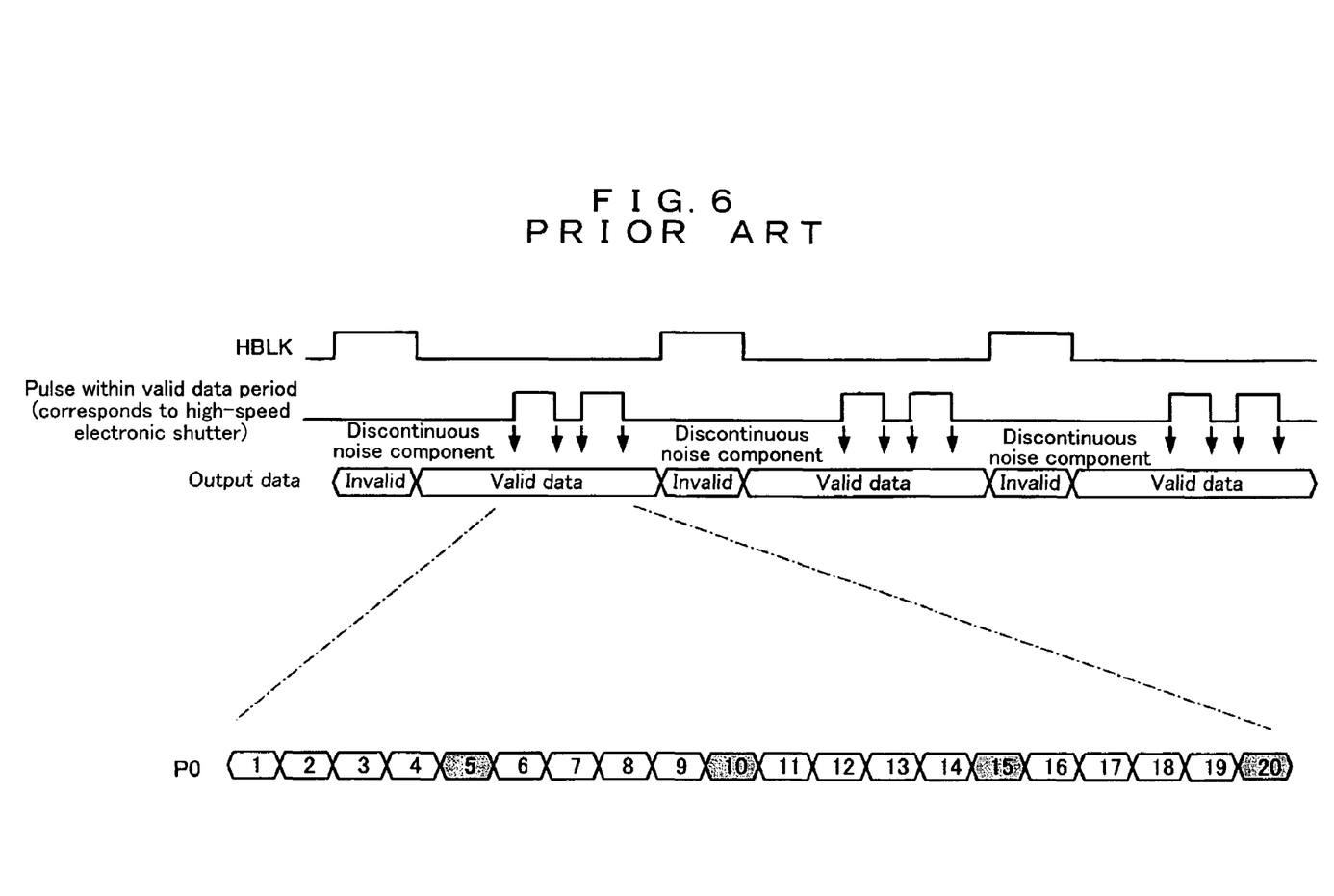
FIG. 6 is a timing chart for showing the operation of the conventional analog front-end device.

If an exposure control period is less than one horizontal period when operating the electronic shutter at a high speed under a highlight environment, the control pulse generated by the timing generator 2 within a valid data period is inputted to the solid-state image pickup sensor 20, as shown in FIG. 6. The solid-state image pickup sensor 20 is driven by the control pulse, and CDS processing, GCA processing, and A/D processing is executed in the driven solid-state image pickup sensor 20 simultaneously with the valid data output period. The result of the processing is outputted from the digital data output device 7 to the outside as the output data. At that time, an operation noise is generated within the valid data period due to the output of the control pulse. The operation noise is generated during the valid period both in the solid-state image pickup sensor 20 and the analog front-end device A'.

In the conventional analog front-end device, output operations of the control pulses at arbitrary positions within the valid data period are executed as the simultaneous operations during the valid data output period, in a mode for operating the high-speed electronic shutter when the exposure control period is less than one horizontal period. Therefore, discontinuous noise components are generated due to the control pulse output operations, and the noise components give bad influences on each part (the inner side of the solid-state image pickup sensor, a connection part between the solid-state image pickup device and the analog front-end device, the timing generator, the CDS circuit, the GCA, the A/D converter, and the like of the analog front-end device). As a result, a fixed pattern noise (FPN) appears on the image (see "5", "10", "15", "20" of the image data P0 in FIG. 6).

SUMMARY OF THE INVENTION

The main object of the present invention therefore is to provide an analog front-end device which can output high-quality sensor data with no fixed pattern noise.

In order to overcome the aforementioned issues, the analog front-end device of the present invention comprises:

- a preprocessor for converting an analog image signal, which is outputted from a solid-state image pickup sensor that photoelectric-converts an optical image of a subject, into digital image data;
- a timing generator which periodically generates a drive pulse for driving the solid-state image pickup sensor continuously/discontinuously, and generates an output stop position signal that indicates an output stop position of the solid-state image pickup sensor when the solid-state image pickup sensor is driven discontinuously in sync with the drive pulse; and
- a continuous data generator which lets through the image data when the output stop position signal is invalid, and converts the image data inputted in a discontinuous state into continuous image data when the output stop position signal is valid.

In this structure, the image signals obtained from the solid-state image pickup sensor under a normal operation are continuous signals, and the image data from the preprocessor is the continuous data. Further, the output stop position signal from the timing generator at that time is invalid, so that the continuous data generator lets through the continuous data from the preprocessor. Meanwhile, the image signals obtained from the solid-state image pickup sensor are discontinuous signals under the operation of a high-speed electronic shutter where an electronic shutter is operated less than one horizontal period. Thus, the image data from the preprocessor at that time becomes discontinuous data. In this case, the output stop position signal from the timing generator becomes valid, so that the continuous data generator converts the discontinuous image data from the preprocessor into the continuous image data by using the output stop position signal. That is, under the operation of the high-speed electronic shutter, output of the solid-state image pickup sensor is temporarily stopped to generate discontinuous output at the timing where the discontinuous noise component is generated due to the output operation of the control pulse in the valid period. Then, the continuous data generator converts the discontinuous image data into the continuous image data and outputs it. As a result, fixed pattern noise generated in the image due to generation of the discontinuous noise component in each part (the inner side of the solid-state image pickup sensor, a connection part between the solid-state image pickup device and the analog front-end device, and the timing generator and the preprocessor of the analog front-end device) can be suppressed, so that high-quality image data can be obtained.

In the present invention, there is such a form that, when an exposure control period of the solid-state image pickup sensor is set to be less than one horizontal period, the timing generator temporarily stops a readout pulse of a pixel signal in a horizontal direction; outputs an accumulated charge amount control pulse for controlling an accumulated charge amount in the solid-state image pickup sensor during the stop period; and restarts output of the readout pulse of the pixel signal in the horizontal direction after outputting the accumulated charge amount control pulse.

With this structure, the timing of the pulse for suppressing the continuous noise component under the operation of the high-speed electronic shutter can be controlled on the analog front-end device side.

Further, there is such a form in the present invention that, as a minimum group delay required for processing performed in the continuous data generator, there is set the time obtained by multiplying the number of stops in output of the image data within one horizontal period and the number of clocks within the image data output stop period; and the continuous data generator comprises a plurality of clock delay devices for delaying output of the image data with a delay time of one period of the image data output stop period, wherein the plurality of clock delay devices are connected in series in number equivalent to the number of stops, and the image data outputted from the clock delay devices is selected in such a manner that the delay time at each of the image data stop positions increases in order from the front in the one horizontal period, so as to generate the continuous image data.

With this structure, it is possible to obtain the high-quality image data without having fixed pattern noise through controlling the continuous data generator, while controlling the timing of the pulse for suppressing the continuous noise component and the discontinuous period on the analog front-end device side.

Furthermore, there is such a form in the present invention that the continuous data generator comprises a memory with a recording capacity of one horizontal period of valid data or more, wherein the continuous data generator writes the image data by discarding a section of invalid data at the output stop position of the solid-state image pickup sensor when writing the image data in order from the front of the one horizontal period to the memory, and reads out the image data continuously when reading out the image data from the memory so as to generate the continuous image data.

With this structure, it is possible to obtain the high-quality image data without having fixed pattern noise through controlling writing and readout of the data to/from the memory in the continuous data generator, while controlling the timing of the pulse for suppressing the continuous noise component and the discontinuous period on the analog front-end device side.

Moreover, there is such a form in the present invention that the continuous data generator comprises a memory with a recording capacity of one horizontal period of valid data or more, wherein the continuous data generator writes the image data including invalid data at the output stop position of the solid-state image pickup sensor when writing the image data in order from the front of the one horizontal period to the memory, and reads out the image data by skipping a section of the invalid data when reading out the image data from the memory so as to generate the continuous image data.

With this structure, it is also possible to obtain the high-quality image data without having fixed pattern noise through controlling writing and readout of the data to/from the memory in the continuous data generator, while controlling the timing of the pulse for suppressing the continuous noise component and the discontinuous period on the analog front-end device side.

Further, there is such a form in the present invention that the continuous data generator reads out the continuous image data in a parallel data form or a serial data form from the memory at a readout timing of n-multiplication (n is a natural number of 2 or larger) of a pixel clock in a horizontal blanking period.

With this structure, it is possible to obtain the high-quality image data without having fixed pattern noise through controlling writing and readout of the data to/from the memory in the continuous data generator to output the data in the horizontal blanking period, while controlling the timing of the pulse for suppressing the continuous noise component and the discontinuous period on the analog front-end device side.

Furthermore, there is such a form in the present invention that the timing generator outputs the output stop position signal as a timing flag signal. Alternatively, there is also such a form that the timing generator outputs the output stop position signal as an address signal using a counter value operative during one horizontal period.

Moreover, there is such a form in the present invention that the timing generator and the continuous data generator separately comprise a register for setting the output stop position of the solid-state image pickup sensor.

With this structure, it is possible to respond to changes in the control only by changing the setting at the time of switching the electronic shutter mode, through controlling the timing of the pulse for suppressing the continuous noise component and the discontinuous period on the analog front-end device side. Therefore, the external digital signal processor can use the same interface as that of the normal continuous readout mode.

Further, the image pickup device of the present invention comprises the solid-state image pickup sensor;

the analog front-end device described above as a first aspect of the present invention; and a digital signal processor for signal-processing output of the analog front-end device.

In the present invention, under the operation of the high-speed electronic shutter, output of the solid-state image pickup sensor is temporarily stopped to generate discontinuous output at the timing where the discontinuous noise component is generated due to the output operation of the control pulse in the valid period. Then, the continuous data generator converts the discontinuous image data into the continuous image data and outputs it. As a result, fixed pattern noise generated in the image due to generation of the discontinuous noise component in each part can be suppressed, so that high-quality image data can be obtained.

The analog front-end device of the present invention can output the high-quality image data without having fixed pattern noise by eliminating the influence of the discontinuous noise component that is generated due to the output operation of the control pulse in the valid period, when an electronic shutter is operated at a high speed under a highlight environment by using a MOS sensor. Therefore, the analog front-end device of the present invention is effectively used as a relay device between a solid-state image pickup sensor and a digital signal processor in a digital camera.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

DETAILED DESCRIPTION OF THE PREFERRED EMBODIMENTS

Figure 1:
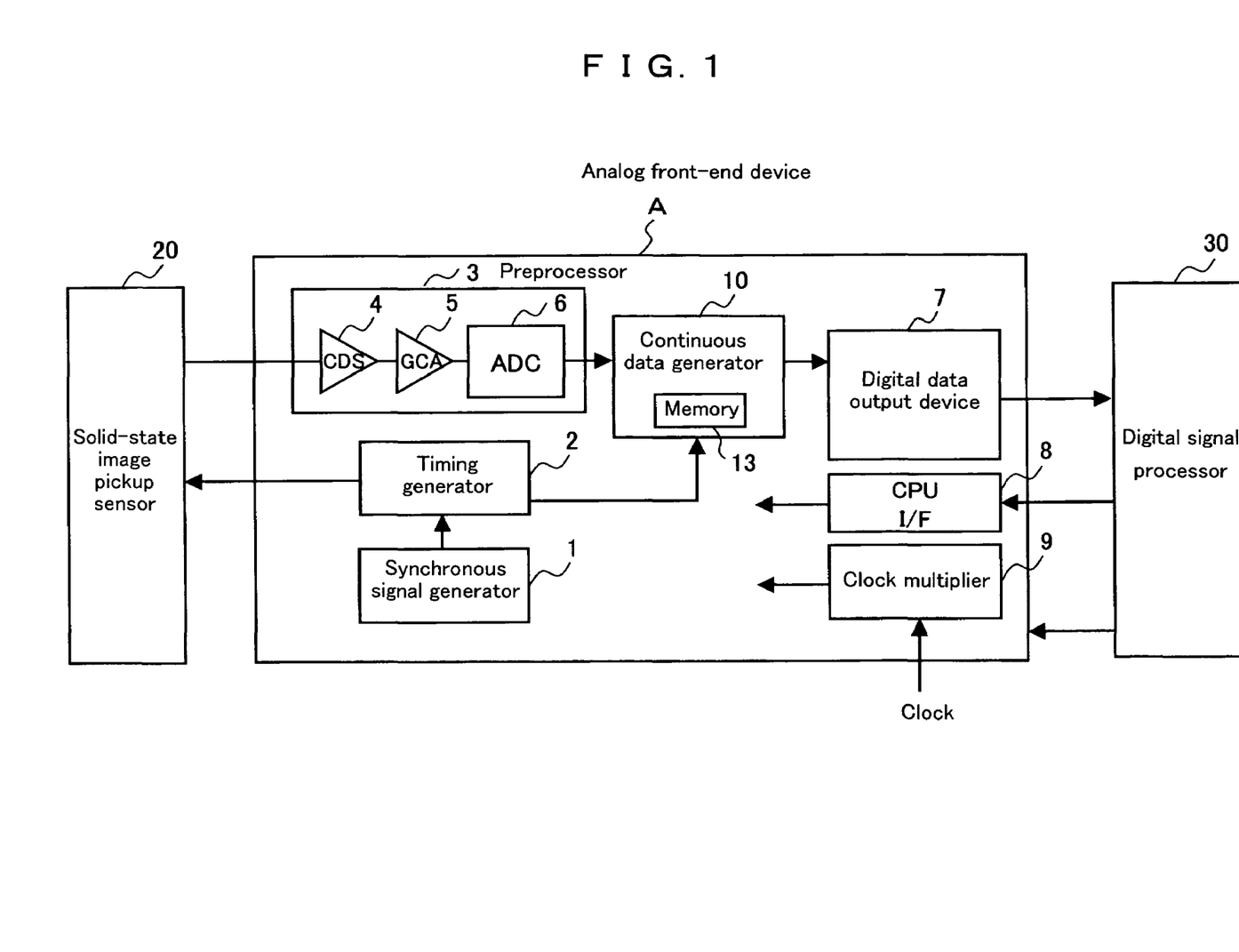
FIG. 1 is a block diagram for showing the structure of an analog front-end device according to embodiments of the present invention.

Hereinafter, embodiments of the analog front-end device according to the present invention will be described in detail by referring to the accompanying drawings. FIG. 1 is a block diagram for showing the structure of the analog front-end device according to the embodiments of the present invention. In FIG. 1, reference code A is an analog front-end device, reference numeral 20 is a solid-state image pickup sensor that is a MOS (Metal Oxide Semiconductor) type image sensor, 30 is a digital signal processor (DSP) for performing image processing and the like, 1 is a synchronous signal generator (SSG) for generating periodic synchronous signals, 2 is a timing generator for periodically generating pulses for driving the solid-state image pickup sensor 20, and 3 is a preprocessor which executes various kinds of processing including the processing for converting analog image signals that are outputted from the solid-state image pickup sensor 20 into digital image data.

The preprocessor 3 comprises: a CDS (correlated double sampling) circuit 4 for eliminating noise from analog charge signals that are inputted from the solid-state image pickup sensor 20; a GCA (gain control amplifier) 5 for controlling the gain of the signals and controlling the direct current component through feedback control; and an A/D converter 6 of n-bits.

Reference numeral 7 is a digital data output device which receives image data and transfer it to the external digital signal processor 30, 8 is an interface provided for an external CPU, and 9 is a clock multiplier which multiplies the clock inputted from the outside by n, and supplies it to the inside.

Reference numeral 10 is a continuous data generator that is provided as a new structural element in the present invention. The continuous data generator 10 converts discontinuous data into continuous image data, when the data outputted from the solid-state image pickup sensor 20 and inputted thereto via the CDS circuit 4, the GCA 5, and the A/D converter 6 is discontinuous data. The timing generator 2 periodically generates the pulses for driving the solid-state image pickup sensor 20 continuously/discontinuously. In the meantime, the timing generator 2 generates an output stop position signal that indicates the output stop position when the solid-state image pickup sensor 20 is driven discontinuously in cync with the drive pulses, and outputs it to the continuous data generator 10.

Figure 2:
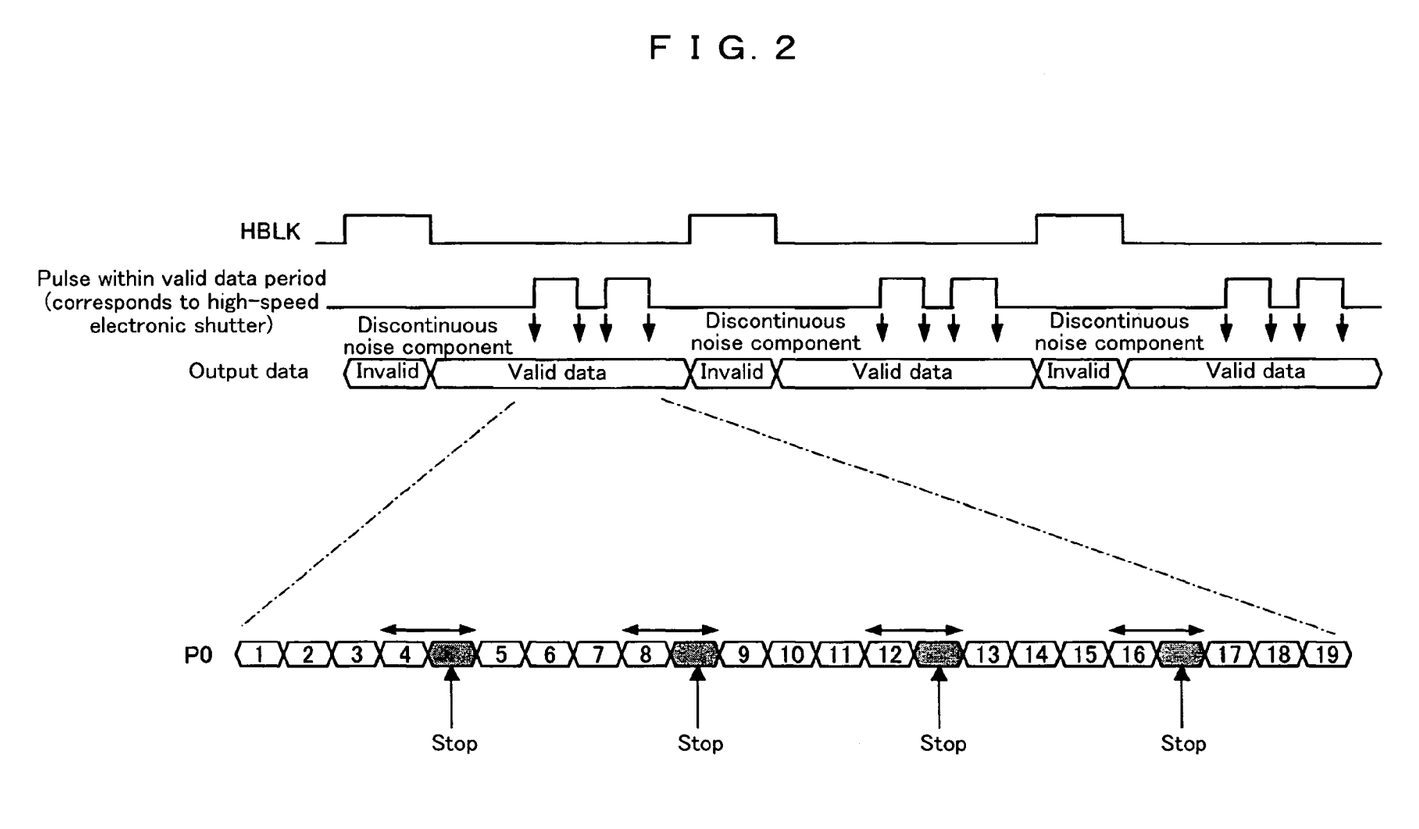
FIG. 2 is a timing chart for showing the operation of the analog front-end device according to the embodiments of the present invention.
Figure 3:
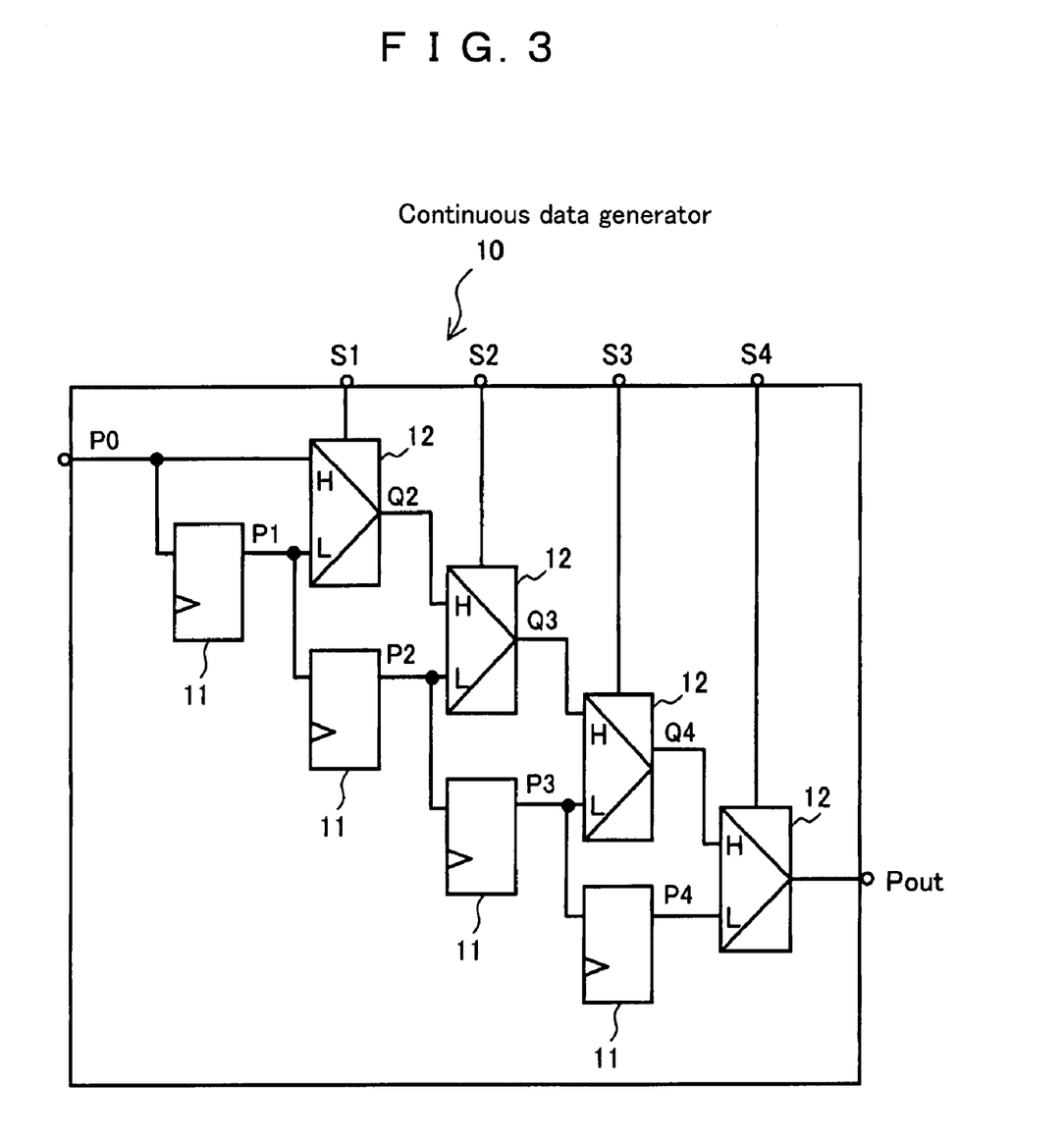
FIG. 3 is a block diagram of a continuous data generator in the analog front-end device according to the embodiments of the present invention.
Figure 4:
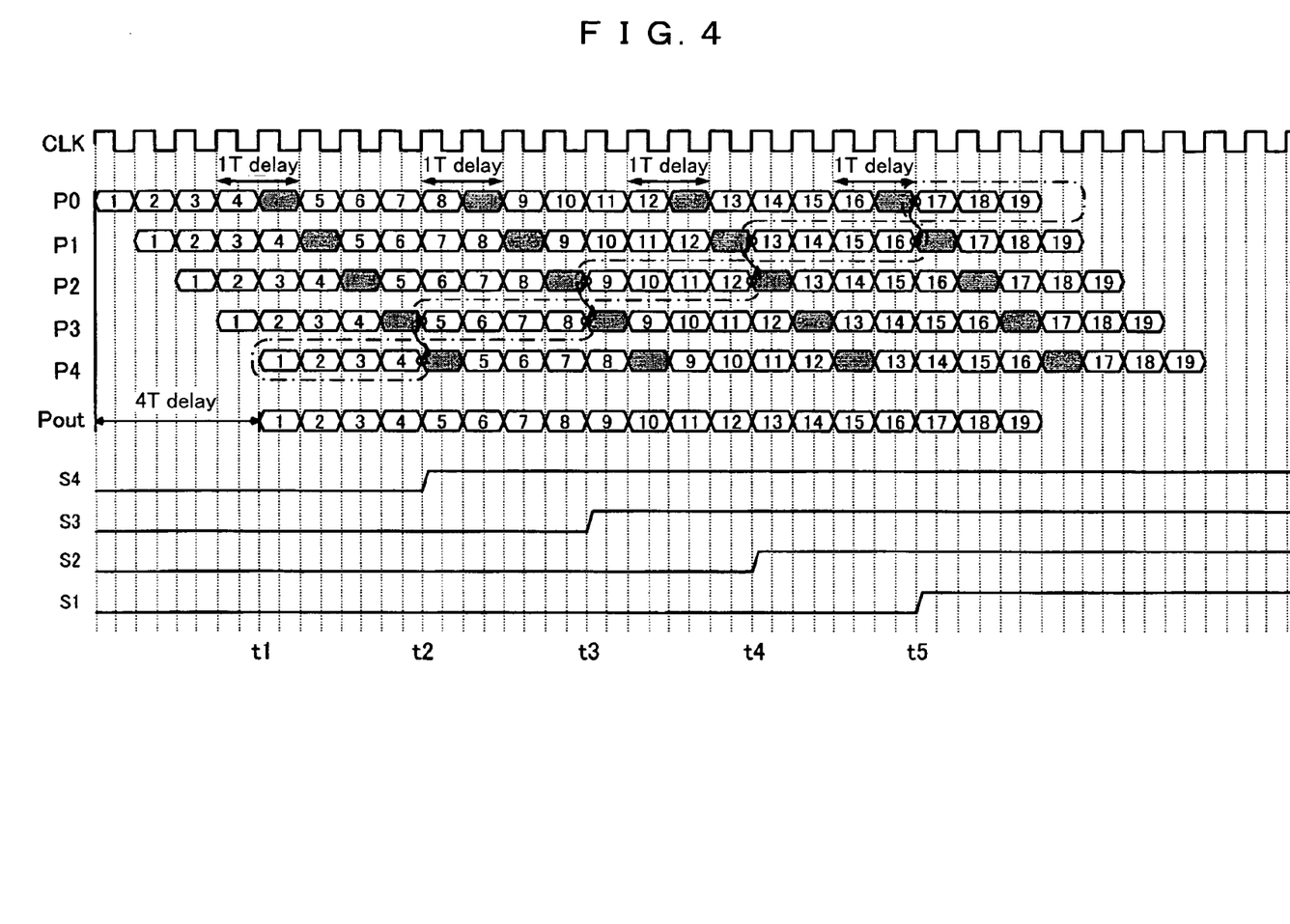
FIG. 4 is a timing chart for showing the operation of the continuous data generator in the analog front-end device according to the embodiments of the present invention.

FIG. 2 shows an example of the layout of the output data of the solid-state image pickup sensor 20. This example shows an example of the output data layout in the case where the solid-state image pickup sensor 20 is stopped periodically to be driven continuously/discontinuously, when the control pulses corresponding to the high-speed electronic shutter in one horizontal period are outputted from the timing generator 2. FIG. 3 shows an example of the structure of the continuous data generator 10. FIG. 4 shows an example of the operation timing chart of the continuous data generator 10, assuming that the number of stops in the horizontal drive is four times, and the period per stop is 1T period. "HBLK" is a horizontal blanking pulse. "T period" used in explanations of the present invention means 1-clock cycle.

The explanations below are provided on assumption that the continuous image data is outputted through the following setting and processing.

The number of stops within one horizontal period is four times,

The clock number within one stop period is one clock,

The minimum group delay is four clocks,

The internal delay is constituted by connecting one-clock delay device 11 (for one stop period) provided in number equivalent to the number of stops (that is, connecting four devices 11), and The data before delay of one stop period is selected by a selector 12 at the stop positions in order from the front of the one horizontal period.

Next, described is the operation of the analog front-end device according to the embodiment that is constituted as described above. First, when imaging light enters the solid-state image pickup sensor 20 through a lens (not shown), it is converted into electric signals by a photodiode or the like of the solid-state image pickup sensor 20, and image signals that are analog point successive signals are generated from the electric signals based on the vertical drive pulse and the horizontal drive pulse outputted from the timing generator 2. Further, the image signals outputted from the solid-state image pickup sensor 20 have the 1/f noise reduced properly in a sample hold circuit of the CDS circuit 4 in the preprocessor 3. Then, the image signals have the gain controlled in the GCA 5, and are converted into digital image signal data (RGB data) by the A/D converter 6. The image signals are outputted in the parallel data form or outputted after being converted from the parallel form into the serial form, from the digital data output device 7 to the external digital signal processor 30. The image signal data inputted to the digital signal processor 30 receive various kinds of processing such as luminance signal processing, color separation, color matrix processing.

Next, described is the operation that is executed when the electronic shutter is operated at a high speed under a highlight environment in a state where the exposure control period is less than one horizontal period. The timing generator 2 temporarily stops the pixel signal readout pulse in the horizontal direction at the rise edge and the fall edge of the pulse shown in FIG. 2, when outputting the pulse for controlling the electronic shutter in less than one horizontal period. Then, in the stopped period, the logic of the pulse, for controlling the accumulated charge amount in the solid-state image pickup sensor 20 as a source for generating the noise, is inverted and outputted. Then, readout of the pixel signals in the horizontal direction is restarted.

In the case of FIG. 2, there are the rise edge and fall edge positions at four points, assuming that there are two pulses within the valid period. Readout of the pixels from the solid-state image pickup sensor 20 is stopped at those edge positions, so that discontinuous image data P0 outputted from the solid-state image pickup sensor 20 has four pieces of invalid data. That is, the discontinuous image data P0 outputted from the solid-state image pickup sensor 20 contains periodic discontinuous information.

The discontinuous image data P0 containing the periodic discontinuous information has 1/f noise reduced properly in the sample hold circuit of the CDS circuit 4 as in the case of the normal operation described above. Further, the gain thereof is controlled in the GCA 5. Then, it is converted by the A/D converter 6 into the image signal data containing the periodic discontinuous information. Furthermore, the image signal data containing the periodic discontinuous information is converted into continuous image data by the continuous data generator 10.

(1) A first embodiment as the structure of the continuous data generator 10 will be described. FIG. 3 shows a concrete structure of the continuous data generator 10, assuming the case where the number of stops in the horizontal drive is four times, and the period per stop is 1T period. Reference numeral 11 is a one-clock delay device, and 12 is a selector. Four pairs of the one-clock delay device 11 and the selector 12 are connected in series.

This structure corresponds to the following cases.
  The number of stops within one horizontal period is four times,
  The clock number within one stop period is one clock, and
  The minimum group delay is four clocks.

In this structure, the clock number within one stop period is one, so that employed as a delay device is one-clock delay device 11 whose delay time is one clock. Further, since there are four stops within one horizontal period, there are four pairs of the one-clock delay device 11 and the selector 12 being provided.

FIG. 4 is a timing chart for sowing the operation of the continuous data generator 10 that corresponds to the structure of FIG. 3. This timing chart shows the state of operation performed on the inputted discontinuous image data P0 under following conditions.
  Image data with one-clock delay is P1,
  Two-clock delay signal is P2,
  Three-clock delay signal is P3,
  Four-clock delay signals is P4,
  First output stop position signal that corresponds to discontinuous image data P4 with four-clock delay is S4,
  Second output stop position signal that corresponds to discontinuous image data P3 with three-clock delay is S3,
  Third output stop position signal that corresponds to discontinuous image data P2 with two-clock delay is S2,
  Fourth output stop position signal that corresponds to discontinuous image data P1 with one-clock delay is S1, and
  The selectors 12 each operate with the output stop position signals S1-S4 as the selection control signals The first-stage selector 12 selects either the discontinuous image data P0 or the discontinuous image data P1 (one-clock delay) that is delayed by one clock from the discontinuous image data P0 by the first-stage one-clock delay device 11. The first-stage selector 12 outputs a selection signal Q2 that is the selected result thereof to the second stage.

The second-stage selector 12 selects either the selection signal Q2 or the discontinuous image data P2 (two-clock delay) that is delayed by one clock from the discontinuous image data P1 by the second-stage one-clock delay device 11. The second-stage selector 12 outputs a selection signal Q3 that is the selected result thereof to the third stage.

The third-stage selector 12 selects either the selection signal Q3 or the discontinuous image data P3 (three-clock delay) that is delayed by one clock from the discontinuous image data P2 by the third-stage one-clock delay device 11. The third-stage selector 12 outputs a selection signal Q4 that is the selected result thereof to the fourth stage.

The fourth-stage selector 12 selects either the selection signal Q4 or the discontinuous image data P4 (four-clock delay) that is delayed by one clock from the discontinuous image data P3 by the fourth-stage one-clock delay device 11. The fourth-stage selector 12 outputs the selected result thereof as continuous image data Pout.

The discontinuous image data P0 is processed into the discontinuous image data P1 (one-clock delay) by the delay processing of the first-stage one-clock delay device 11, and inputted to the first-stage selector 12. The discontinuous image data P1 (one-clock delay) is processed into the discontinuous image data P2 (two-clock delay) by the delay processing of the second-stage one-clock delay device 11, and inputted to the second-stage selector 12. The discontinuous image data P2 (two-clock delay) is processed into the discontinuous image data P3 (three-clock delay) by the delay processing of the third-stage one-clock delay device 11, and inputted to the third-stage selector 12. The discontinuous image data P3 (three-clock delay) is processed into the discontinuous image data P4 (four-clock delay) by the delay processing of the fourth-stage one-clock delay device 11, and inputted to the fourth-stage selector 12. The fourth-stage selector 12 selects the discontinuous image data P4 (four-clock delay) for 4T periods, in the period where the output stop position signal S4 is "L" level. The selected image data P4 is the data of "1", "2", "3", and "4" (timing t1-timing t2).

When the output stop position signal S4 becomes "H" level at the timing t2, the fourth-stage selector 12 selects the selection signal Q4 from the third-stage selector 12. Since the output stop position signal S3 up to the timing t3 is "L" level, the third-stage selector 12 selects the discontinuous image data P3 (three-clock delay). Thus, the fourth-stage selector 12 that has been in an "H" level side selection state selects the data of "5", "6", "7", and "8" from the timing t2 to the timing t3 in the discontinuous image data P3 (three-clock delay).

When the output stop position signal S3 becomes "H" level at the timing t3, the third-stage selector 12 selects the selection signal Q3 from the second-stage selector 12. Since the output stop position signal S2 up to the timing t4 is "L" level, the second-stage selector 12 selects the discontinuous image data P2 (two-clock delay). Thus, the third-stage and fourth-stage selectors 12 that have been in an "H" level side selection state output the data of "9", "10", "11", and "12" from the timing t3 to the timing t4 in the discontinuous image data P2 (two-clock delay).

When the output stop position signal S2 becomes "H" level at the timing t4, the second-stage selector 12 selects the selection signal Q2 from the first-stage selector 12. Since the output stop position signal S1 up to the timing t5 is "L" level, the first-stage selector 12 selects the discontinuous image data P1 (one-clock delay). Thus, the second-stage, third-stage, and fourth-stage selectors 12 that have been in an "H" level side selection state select the data of "13", "14", "15", and "16" from the timing t4 to the timing t5 in the discontinuous image data P1 (one-clock delay).

When the output stop position signal S1 becomes "H" level at the timing t5, the first-stage selector 12 selects the discontinuous image data P0. Thus, the first-stage, second-stage, third-stage, and fourth-stage selectors 12 that have been in an "H" level side selection state select the data of "17", "18", and "19" at the timing t5 and thereafter in the discontinuous image data P0. This corresponds to the continuous image data Pout.

In conclusion, the continuous data generator 10 outputs the valid continuous data of "1"-"19" from the fourth-stage selector 12.

(2) A second embodiment as the structure of the continuous data generator 10 will be described. In the second embodiment, the continuous data generator 10 comprises a memory 13 for storing the image data of one line. The memory 13 is constituted with a RAM, for example. When the discontinuous image data P0 shown in FIG. 2 is inputted, the address of the section of invalid data period is kept but writing of the section is skipped in the writing control to the memory 13. Through this control, the data written to the memory 13 can form the continuous image data. For the memory readout control started before the writing operation, the continuous image data with arbitrary delay can be outputted by reading out the data in order from the front address.

It is also possible to write the discontinuous image data P0 in that state including the invalid data when writing the data to the memory 13, and read the data by skipping the address of the section of the invalid data period when reading out the data in order from the front address through the memory readout control. In this manner, it is also possible to output the continuous image data with arbitrary delay.

The memory control address for the continuous data generator 10 may be supplied from the timing generator 2. Alternatively, an address generating counter may be separately provided within the continuous data generator 10.

In the structure where the continuous data generator 10 and the timing generator 2 comprise a horizontal address counter, respectively, so as to control the continuous image data, a discontinuous position setting register may be provided separately to the timing generator 2 and the discontinuous data generator 10. This enables the operation setting to be done in advance through the CPU interface 8. With this structure, the discontinuous period can be controlled on the analog front-end device A side. Thus, it is possible to stop the operations of each part (the inner side of the solid-state image pickup sensor, a connection part between the solid-state image pickup device and the analog front-end device, the timing generator, the CDS circuit, the GCA, the A/D converter, and the like of the analog front-end generator) before and after the timing at which the discontinuous noise component is generated due to the operation of the control pulse at the time of operating the high-speed electronic shutter. Through this, it is possible with the continuous data generator 10 to obtain the high-quality image data without having fixed pattern noise, after digital-converting the image data without influencing the horizontal drive pulse and the sensor analog signal.

The present invention has been described in detail by referring to the most preferred embodiments. However, various combinations and modifications of the components are possible without departing from the spirit and the broad scope of the appended claims.

What is claimed is:

1. An analog front-end device, comprising:
   a preprocessor for converting an analog image signal, which is outputted from a solid-state image pickup sensor that photoelectric-converts an optical image of a subject, into digital image data;
   a timing generator which periodically generates a drive pulse for driving said solid-state image pickup sensor continuously/discontinuously, and generates an output stop position signal that indicates an output stop position of said solid-state image pickup sensor when said solid-state image pickup sensor is driven discontinuously in sync with said drive pulse; and
   a continuous data generator which lets through said image data when said output stop position signal is invalid, and converts said image data inputted in a discontinuous state into continuous image data when said output stop position signal is valid.

2. The analog front-end device according to claim 1, wherein, when an exposure control period of said solid-state image pickup sensor is set to be less than one horizontal period, said timing generator temporarily stops a readout pulse of a pixel signal in a horizontal direction; outputs an accumulated charge amount control pulse for controlling an accumulated charge amount in said solid-state image pickup sensor during said stop period; and restarts output of said readout pulse of said pixel signal in said horizontal direction after outputting said accumulated charge amount control pulse.

3. The analog front-end device according to claim 1, wherein:
   as a minimum group delay required for processing performed in said continuous data generator, there is set time obtained by multiplying number of stops in output of said image data within one horizontal period and the number of clocks within said image data output stop period; and
   said continuous data generator comprises a plurality of clock delay devices for delaying output of said image data with a delay time of one period of said image data output stop period, wherein
   said plurality of clock delay devices are connected in series in number equivalent to said number of stops, and said image data outputted from said clock delay devices is selected in such a manner that said delay time at each of said image data stop positions increases in order from the front in said one horizontal period, so as to generate said continuous image data.

4. The analog front-end device according to claim 1, wherein said continuous data generator comprises a memory with a recording capacity of one horizontal period of valid data or more, wherein
   said continuous data generator writes said image data by discarding a section of invalid data at said output stop position of said solid-state image pickup sensor when writing said image data in order from the front of said one horizontal period to said memory, and reads out said image data continuously when reading out said image data from said memory so as to generate said continuous image data.

5. The analog front-end device according to claim 1, wherein said continuous data generator comprises a memory with a recording capacity of one horizontal period of valid data or more, wherein
   said continuous data generator writes said image data including invalid data at said output stop position of said solid-state image pickup sensor when writing said image data in order from the front of said one horizontal period to said memory, and reads out said image data by skipping a section of said invalid data when reading out said image data from said memory so as to generate said continuous image data.

6. The analog front-end device according to claim 4, wherein the continuous data generator reads out said continuous image data in a parallel data form or a serial data form from said memory at a readout timing of n-multiplication (n is a natural number of 2 or larger) of a pixel clock in a horizontal blanking period.

7. The analog front-end device according to claim 5, wherein the continuous data generator reads out said continuous image data in a parallel data form or a serial data form from said memory at a readout timing of n-multiplication (n is a natural number of 2 or larger) of a pixel clock in a horizontal blanking period.

8. The analog front-end device according to claim 1, wherein said timing generator outputs said output stop position signal as a timing flag signal.

9. The analog front-end device according to claim 1, wherein said timing generator outputs said output stop position signal as an address signal using a counter value operative during one horizontal period.

10. The analog front-end device according to claim 1, wherein said timing generator and said continuous data generator separately comprise a register for setting said output stop position of said solid-state image pickup sensor.

11. An image pickup device, comprising:
said solid-state image pickup sensor;
said analog front-end device of claim 1; and
a digital signal processor for signal-processing output of said analog front-end device.

* * * * *